(12) United States Patent
Thomson

(10) Patent No.: US 6,182,283 B1
(45) Date of Patent: *Jan. 30, 2001

(54) LINKER OPTIMIZATION FOR COMPILED OBJECT ORIENTED PROGRAMS

(75) Inventor: Brian Ward Thomson, North York (CA)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/763,190

(22) Filed: Dec. 10, 1996

(30) Foreign Application Priority Data

Mar. 15, 1996 (CA) .................................................. 2171898

(51) Int. Cl.[7] ...................................................... G06F 9/44
(52) U.S. Cl. .................................................. 717/9; 717/10
(58) Field of Search ..................................... 395/710, 705, 395/683, 685, 702, 706, 708; 364/232.1, 256.3, 256.4, 256.5, 256.6, 961.2, 978, 978.1; 707/103; 711/203, 6; 702/119, 123, 182, 183, 185, 186; 717/9, 10

(56) References Cited

U.S. PATENT DOCUMENTS

| | | | |
|---|---|---|---|
| 5,297,284 | * | 3/1994 | Jones et al. ........................ 395/705 |
| 5,327,562 | * | 7/1994 | Adcock ................................ 717/7 |
| 5,408,665 | * | 4/1995 | Fitzgerald .......................... 395/710 |
| 5,442,793 | * | 8/1995 | Christian et al. .................. 395/683 |
| 5,632,034 | * | 5/1997 | O'Farrell ........................... 395/701 |

OTHER PUBLICATIONS

Design and Evolution of C ++, Bjaurne Stroustrup, Mar. 1994.*

Compilers, Principles, Techniques and Tools, Aho et al. pp. 530, 531, 555, 595, Mar. 1994.*

Dictionary of Object Technology, D.G. Firesmith et al. pp. 270, 473, 474, Mar. 1994.*

* cited by examiner

Primary Examiner—Tariq R. Hafiz
Assistant Examiner—Todd Ingberg
(74) Attorney, Agent, or Firm—F. Chau & Asscociates, LLP

(57) ABSTRACT

When compiling a program using an object oriented language and virtual functions addressed by virtual function tables, the program may include virtual functions that are defined but not used. The compiler identifies such functions by tagging each defined virtual function with a code identifying it as a member of related virtual functions. The compiler also tags each virtual function call to identify which group (or groups) of related virtual functions are candidates for invocation by the virtual function call at runtime. The linker combines the two codes to identify which defined virtual functions are not candidates for invocation by any virtual function call. The linker omits those non-candidate virtual functions from the link if all references to them were from virtual function tables.

17 Claims, 12 Drawing Sheets

LINKER OPTIMIZATION FOR COMPILED OBJECT ORIENTED PROGRAMS

FIELD OF THE INVENTION

The present invention is directed to an optimization method performed during program compilation and linking for removing unused program components prior to linking the program executable.

BACKGROUND OF THE INVENTION

An object-oriented program is a program used to control the execution of a digital computer, where the program is created using a set of language tools, abstractions and constructs that support a particular form of user-defined types, called "classes". Each such type associates a collection of declared data with a set of operations on that data. Variables, or instances, of such types in the running programs are called objects.

Classes can be related to one another by inheritance. The properties, behaviours, data, and operations of a parent, or "base", class may be inherited without modification by some child, or "derived" class, or the behaviours, properties, and operations may be selectively refined under control of the programmer. When defining a derived class, one may start by building on an existing base class which is similar to the one to be created. The derived class inherits the implementation and behaviour of the base class, except as modified by amendments detailed in the derived class definition. Several classes can inherit the behaviours of a common parent, and a derived class may inherit from more than one base class. As examples, squares can inherit from rectangles, circles from ellipses, and stacks and queues from collections.

A member function is a function or operation defined as a behaviour of some user-defined type where that type participates in a hierarchy of other types. A virtual function is a member function with the added property that the specific identity of the virtual function, when invoked by name, is to be determined at execution time as a function of the type of the object with which it is associated. This is in contrast to member functions that are not virtual functions, whose specific identity, when invoked by name, is determined at compilation time as a function of the declared type of the variable used to access the object.

Each of several types in an inheritance hierarchy may contain its own definition of a member function where the name is common to all such types. If the function is a virtual function, as determined by and under the control of the programmer, then the function that is invoked at execution time will be determined from the type of the object which is the primary operand of the function instead of from the type of declared name that designates the object on which the function is to operate. Calls to virtual functions can be implemented as indirect calls through a table, called a virtual function table. Virtual function tables are created by the compiler for each user-defined type or class whose implementation requires such tables.

In the C++ language, the compiler defines an object data structure for each class. If a class introduces a virtual function or has an overriding function, then the compiler allocates a virtual function table for the class. In the C++ language, an override function is a member function of a class that has the same name, same number and same types of parameters as a member function declared with the virtual keyword in a base class of the class. The class object data structure contains the layout of the data members and a virtual function table pointer. The virtual function table pointer is initialized during run time to point to the virtual function table associated with the class.

A virtual function table for a class contains addresses of the virtual function members that are to be invoked at execution time when the class is the type of the object that is the primary operand of the function. The compiler and linker are jointly responsible for initializing a virtual function table with the addresses appropriate for its class. The virtual function table is used at run time to invoke the virtual functions indirectly. Each base class with a virtual function member has an associated virtual function table. Derived classes may have more than one virtual function table, since one may be associated with each base class, and their object data structures may, therefore, contain more that one virtual function table pointer. After memory for an object is allocated, the virtual function table pointers are initialized with the addresses of the associated virtual function table. Thus, all objects of the same class type point to the same virtual function tables. To implement the invoking of a virtual function, the compiler generates code to access the virtual function member through the virtual function table.

The C++ object oriented programming language, in particular, provides a powerful and popular virtual function feature. One virtual function overrides another function in accordance with specific rules that are language dependent. Under certain circumstances, the use of the virtual function feature can cause very large executable files to be generated for what should be relatively simple programs. This results in an unnecessary use of disk space for storing the program, and memory for executing it.

This situation commonly results from the established practice of using virtual function tables, pointed to by virtual function pointers embedded in the objects, in the runtime dispatching of virtual functions. These tables typically contain references to all virtual functions that might conceivably be dispatched in any application containing the object. In some applications this may result in unnecessarily linking in definitions for virtual functions that will never be called, and it is this redundancy that the present invention is directed to eliminating.

U.S. Pat. No. 5,247,678 issued Sep. 21, 1993 to Texas Instruments Inc. describes a multiprocessor system that links extended functions. The patent describes a dynamic linker that determines whether there are any functions loaded in the active memory which are not needed by the application program and, if so, discards them from the active memory. However, this patent does not teach a process where inactive functions are removed from the program itself as in the present invention.

U.S. Pat. No. 5,297,284 issued Mar. 22, 1994 to Microsoft Corp. describes a method simply for implementing virtual functions and virtual base classes in a compiler for an object-oriented programming language. This patent also does not consider the problem created by maintaining references to uncallable virtual functions in the compiled and linked program which of the present invention addresses.

U.S. Pat. No. 5,327,562 issued Jul. 5, 1994 to Microsoft Corp. describes a method for implementing virtual functions in a compiler for an object-oriented programming language. The patent does not describe any mechanism for removing references to uncallable virtual functions in the compiled and linked program.

By contrast, a primary purpose of the present invention is to remove uncallable virtual functions from a compiled and linked program.

A secondary purpose of the present invention is to avoid maintaining calls to virtual functions in a compiled and linked program when it can be determined that those virtual functions are uncallable.

To achieve this and other objects, the present invention provides means to reduce the negative impact of using virtual functions in the C++ language by identifying and removing references to unused virtual functions from the executable code. This is achieved by tagging the definitions and uses of virtual functions during compilation in such a manner that the linker can identify those functions which cannot be called in the application and so can ignore or exclude the definitions of those virtual functions.

Accordingly, in a computing environment having compiler means for compiling an object oriented source program into object modules and linker means for linking the object modules into an executable file provided with means including means for initializing virtual function tables for invoking virtual functions at runtime, a method is provided for improving the execution efficiency of the executable file. The method includes the steps of generating control data identifying each virtual function table during compilation wherein the control data is accessible during linking for identifying virtual functions as potentially callable, and linking only virtual functions identified as potentially callable.

Preferably, the step of generating control data consists of compiling a list of defined introducers for each virtual function encountered during compilation of the source program, compiling a list of called introducers, each called introducer identifying a group of virtual functions which includes a function that is actually called and embedding the lists as the control data records in object modules. Preferably, the step of linking only virtual functions identified as potentially callable consists of accumulating a list of virtual functions that are only referenced through a virtual function table, and linking pointers to virtual functions potentially used as determined from the lists of defined introducers and called introducers embedded as the control data records, and the list of virtual functions compiled during linking.

An improved system for converting source code written in an object oriented language into an executable file is also provided. The improvement consists of means for generating a list of defined introducers that each identifying a group of virtual functions, means for maintaining a list of virtual functions that are only referenced through a virtual function table, means for generating a list of called introducers that each identifying a group of virtual functions potentially called and means for generating the executable file to exclude those virtual functions that are only referenced through a virtual function table and are not identified by the lists of defined introducers, called introducers and virtual functions.

The invention is also directed to a mechanism for improving execution efficiency of machine executable code derived from a source program written in a compilable object oriented programming language. The mechanism has a compiler adapted to tag definitions and uses of virtual functions during compilation, and linking means adapted to identify tagged virtual functions, to link definitions of tagged definitions that can be called and to nullify the definitions of said tagged virtual functions that cannot be called.

Finally, the present invention provides computer program product that includes a computer usable medium having new, useful and nonobvious combination of computer readable program code means programmed so as to cause a computer to perform the method described above.

DETAILED DESCRIPTION OF THE PREFERRED EMBODIMENT

Figure 1:
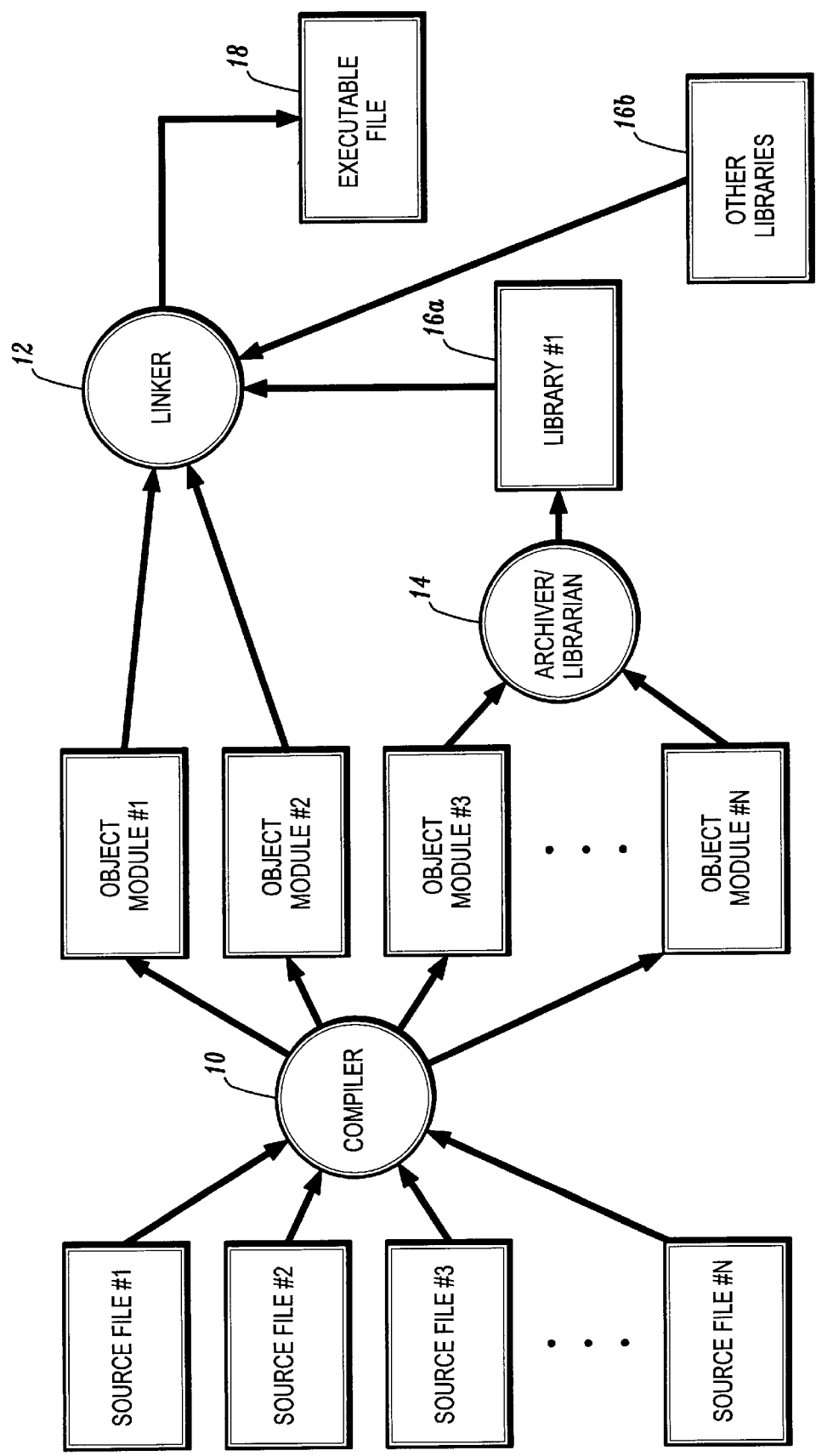
FIG. 1 is a schematic illustration of the manner in which a compiler and a linker create an executable file.

FIG. 1 illustrates schematically the manner in which a program, written in the C++ language, is compiled and linked into an executable file. The source code is provided to the C++ compiler 10 which compiles the code into a plurality of object modules. Each object module contains a representation of the machine code and data generated by the compiler 10 to correspond to the supplied source code, together with control information including, but not limited to, descriptions of symbol references and definitions, descriptions of relocation actions that must occur when the code or data is allocated to machine addresses, and debugging information. Each compiled object module is suitable for combination with other object modules.

The combination of object modules is effected by a linker, a linking loader, or a similar utility 12. The utility combines the object modules to form an executable program 16, and in so doing resolves references from one object module to symbols found in another. The symbols represent subroutine and data definitions.

Participating object modules may be specified individually to the linker, as is shown for Object Modules #1 and #2, or, having been grouped, as is shown with reference to Object Modules #3 and #4, by a librarian or similar archiving mechanism into an object module library, generally denoted by 16. The library may be given as input to the linker. In this latter case, the linker selectively extracts, from the library, the object modules required to complete the executable program, and incorporates them into the program. The criterion for this selection is that the selected object module must provide a definition for one or more symbols that are referenced by other object modules already incorporated into the program. This will be more fully described hereinafter with reference to FIG. 10.

The linker's task is to connect the modules together into a cohesive and efficient executable machine readable file. In the prior art, if the compiler referenced a virtual function by a pointer in a virtual function table, the linker had no means of determining whether the referenced function would be needed during performance of the program. Therefore, it had to leave the virtual function in the linked program even if the virtual function was never going to be used.

With the present invention, the compiler now includes information in the modules about their use of virtual functions. From this information, the linker is able to determine whether there exists within the program a call that may invoke the function. If there can be no call invoking the function, the linker is able to exclude the virtual function from the resulting executable program.

The following simple declarations for the C++ language will help to illustrate how virtual functions may be referenced and not used.

```
class A {
    public:
        virtual int f( );
        virtual int g( );
} a;
class B_A: public A {
    public:
        int f( );
} b_a;
class C_A: public A {
    public:
        int f( );
        int g( );
} c_a;
int A::f( ) { return 0; }
int B::f( ) { return 1; }
int C_A::f( ) { return 2; }
int A::g( ) { return 123; }
int C_A::g( ) { return 456; }
main( )
{
    class A * aptr;
    int I;
    aptr = &a;
    I = aptr->f( ); // returns 0
    aptr = &b_a;
    I = aptr->f( ); // returns 1
    aptr = &C_a;
    I = aptr->f( ); // returns 2
}
```

This particular example is simple enough that a compiler could determine the actual type of the object pointed to by the pointer, aptr to class A, and hence could determine which function f( ) should be called. In this case, the compiler could generate direct calls to A::f( ), B_A::f( ), and C_A::f( ). The C++ language permits this optimization. However, this is not achievable in the general case because the value of the pointer may depend on an arbitrarily complex calculation that cannot be predicted at compile time. For this reason, most compilers of the C++ language use a runtime implementation.

In a typical runtime implementation of virtual functions, each object whose class contains or inherits virtual functions has a pointer to one or more virtual function tables, or "VFTs". The VFT pointer is at a known location relative to the beginning of the object, typically before any user-defined data. The same VFT is pointed at by every instance of the class in question. An object's VFT contains pointers to the functions that should be called for that object.

When a virtual function is introduced by a class, such as the function f( ) introduced by class A above, the compiler allocates it a slot in the VFT for that class. The VFT always has the same order of virtual functions based on information obtained from the base class. Classes derived from A that do not override the function will also have a pointer to A::f( ) in the same slot in their tables. This is illustrated schematically in FIG. 9. In addition, classes that do override the function introduced by class A (such as B_A and C_A) will contain pointers to the correct overriding function in that slot.

Figure 9:
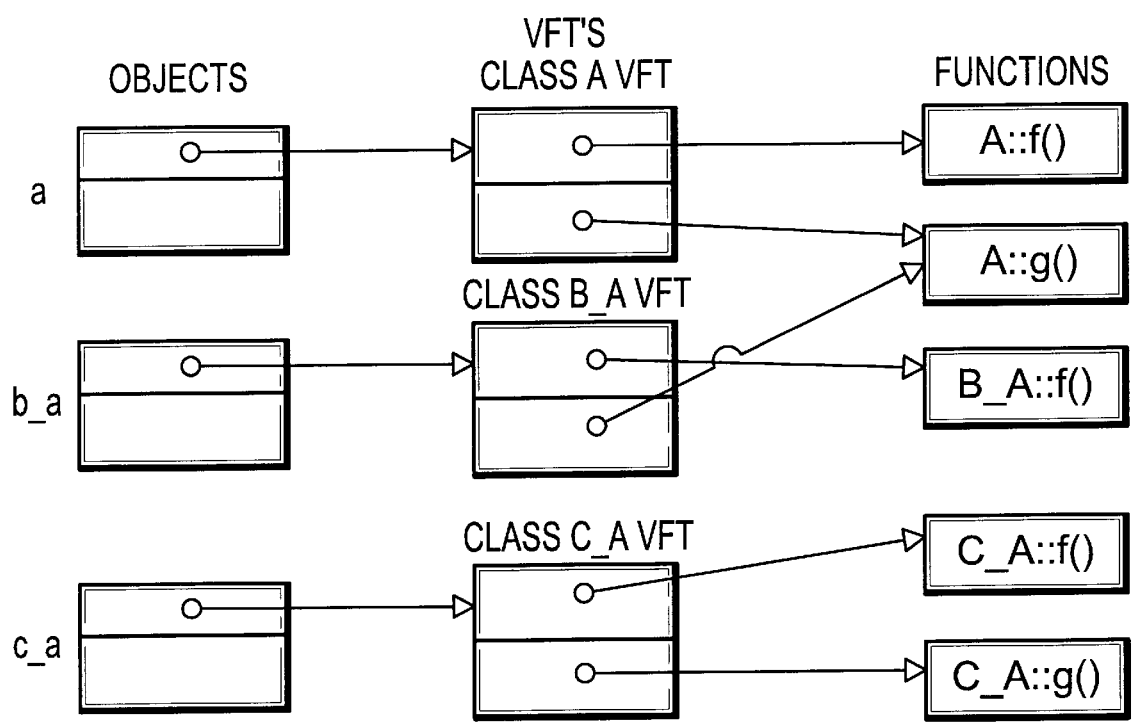
FIG. 9 is a schematic illustration of the references that exist between objects, virtual function tables, and virtual functions.

FIG. 9 shows the relationship between the objects "a", "b_a" and "c_a" of class types A, B_A and C_A, respectively, and the VFTs constructed by the compiler for those classes. Each object data structure contains a pointer to its corresponding VFT. Each VFT has two slots, the first containing a pointer to the appropriate f( ) function to call for objects of that class and the second containing a pointer to the appropriate g( ) function, as described above. More complicated classes with virtual or multiple base classes may contain several pointers to different VFTs. In that case, a given overriding function may appear in different slots in the various VFTs.

In the example shown in FIG. 9, the VFT for class A contains a pointer to the function A::f( ) in its first slot, and a pointer to the function A::g( ) in its second slot. Class B_A overrides function f( ), and therefore the VFT for class B_A contains a pointer to the function B_A::f( ) in its first slot as function B_A::f( )overrides function A_::f( ). However, since class B_A does not override function g( ), the second slot of the class B_A VFT also contains a pointer to the function A::g( ). Class C_A, on the other hand, overrides both functions f( ) and g( ), and so its VFT contains a pointer to the function C_A::f( ) in its first slot and a pointer to the function C_A::g( ) in its second slot.

Calls like aptr->f( ) are implemented by essentially doing
(* aptr->_VFT[correctSlotNumber]) ( );

In this way, if aptr currently points to an object that is an instance of class A, then either the function A::f( ) or the function A::g( ) will be invoked. However, for the same generated code, if aptr currently points to an object that is an instance of derived class C_A, then the function invoked will be one of C_A::f( ) and C_A::g( ).

The calls using aptr may appear in compilations that are unaware of the definitions or even of the existence of the derived classes B_A and C_A. Moreover, there need not exist any single compilation unit in which all derived classes are known, so the compiler may not be able to even identify all of the candidate functions that may possibly be invoked by a call using the pointer aptr.

A similar level of uncertainty exists when compiling the definitions of the classes. When a compiler processes the definition of class B_A it need not have encountered all, or even any, potential uses of objects of that class. This implies that the VFT for class B_A must be constructed without full knowledge of how that class may be used. Its VFT is therefore built containing references to all virtual member functions of that class, whether or not the complete program actually calls any of them. In the example illustrated in FIG. 9, the g( ) function pointers are present in each VFT even though the program does not contain any calls to g( ). When the program is linked, definitions of the uncallable A::g( ) and C_A::g( ) functions must be available to initialize these pointers. If the application is statically linked, it will contain the bodies of all virtual functions defined for the classes it uses. If those functions then use other classes, the linker will require the transitive closure of all virtual functions in these classes as well as any non-virtual functions they also reference.

In this manner, it is possible for almost all of the modules in a class library to be interconnected by these VFT references, so that use of any part of the library results in linking in all the parts of all the modules.

Figure 10:
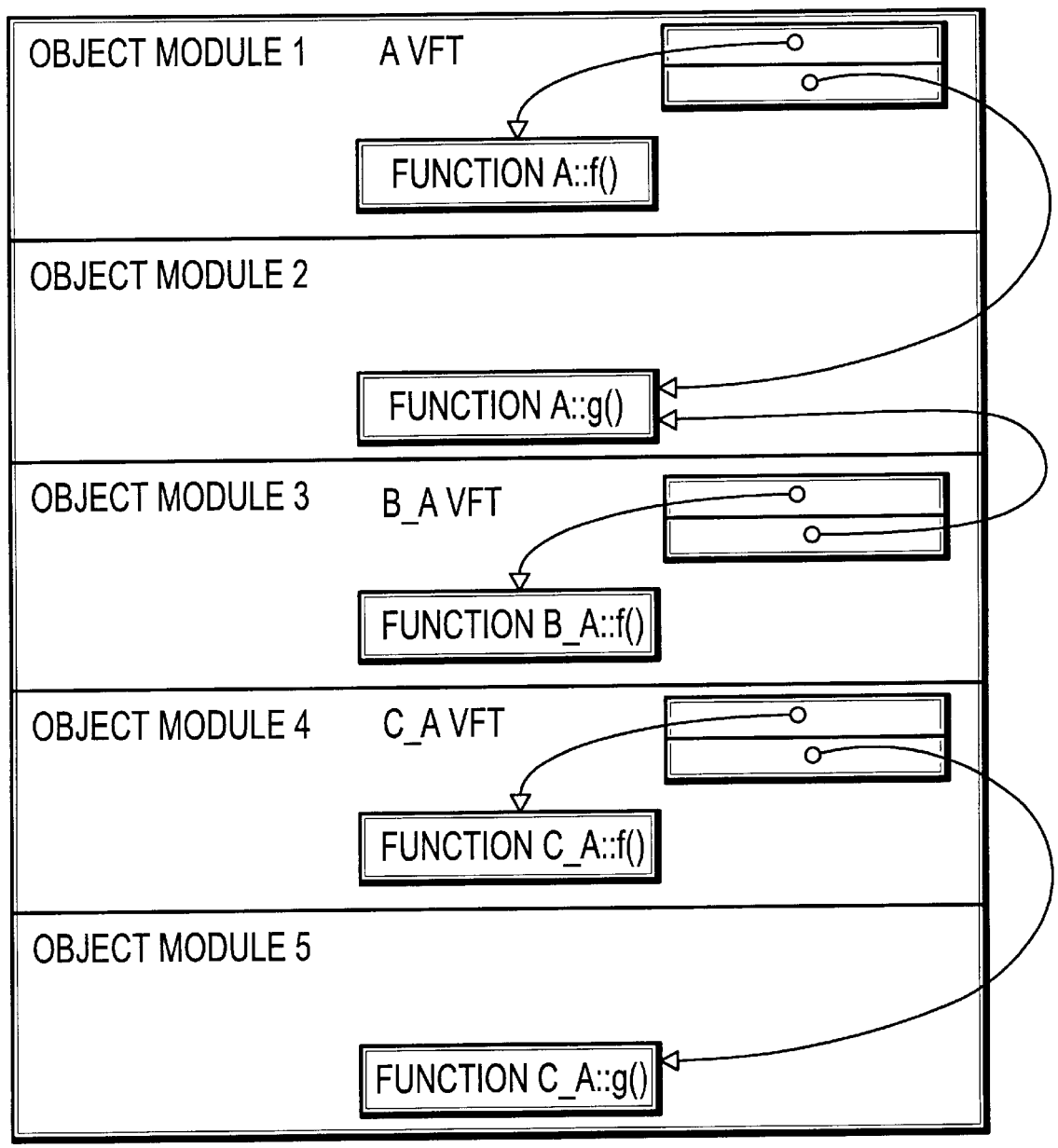
FIG. 10 is a schematic representation of a plurality of object modules including virtual function tables.

FIG. 10 demonstrates how the functions and VFTs in the above example might be distributed among modules in a static library. The VFTs created contain references to the functions A::g( ) and C_A::g( ), and therefore the linker will include the modules defining those functions in the executable file it creates, even though neither of those functions can possibly be called during the execution of this application. This is illustrated schematically in FIG. 11a.

As shown in the example and FIG. 10, the VFT's are found in modules 1, 3 and 4 and each module contains a single function. A reference requiring either module 1 or 3 would require the linker to also load module 2, and a reference to module 4 would require module 5, because, prior to the present invention, the linker would be unable to determine which function might actually be called. With the present invention, the compiler identifies defined and called introducers for the referenced function and thereby provides the linker with an opportunity to determine which functions and thereby, which modules, may not be needed and, hence need not be linked in the executable program. This concept is more fully described hereinafter.

The present invention eliminates unused virtual functions from the linker output by performing the following three step process:

1. Identifying all virtual functions which are referenced from VFTs,
2. Determining which of those referenced functions are potentially callable, and
3. Nullifying all VFT references to functions which are not among those determined in step 2.

Figure 11A:
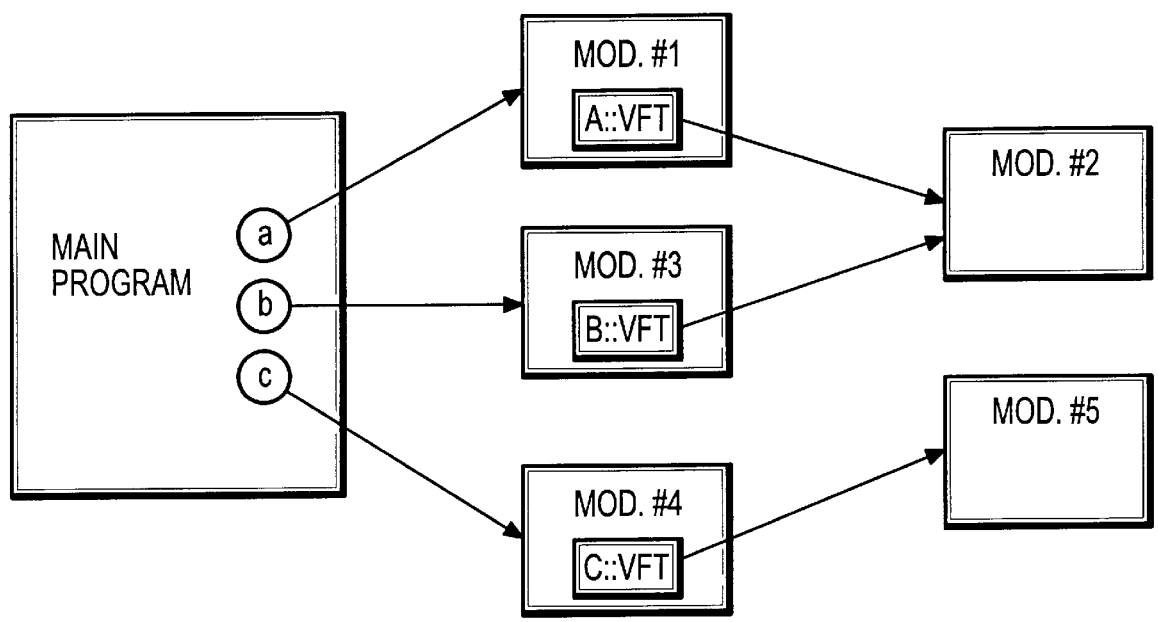
FIGS. 11a and 11b schematically illustrate the difference in linker output through use of the present invention.
Figure 11B:
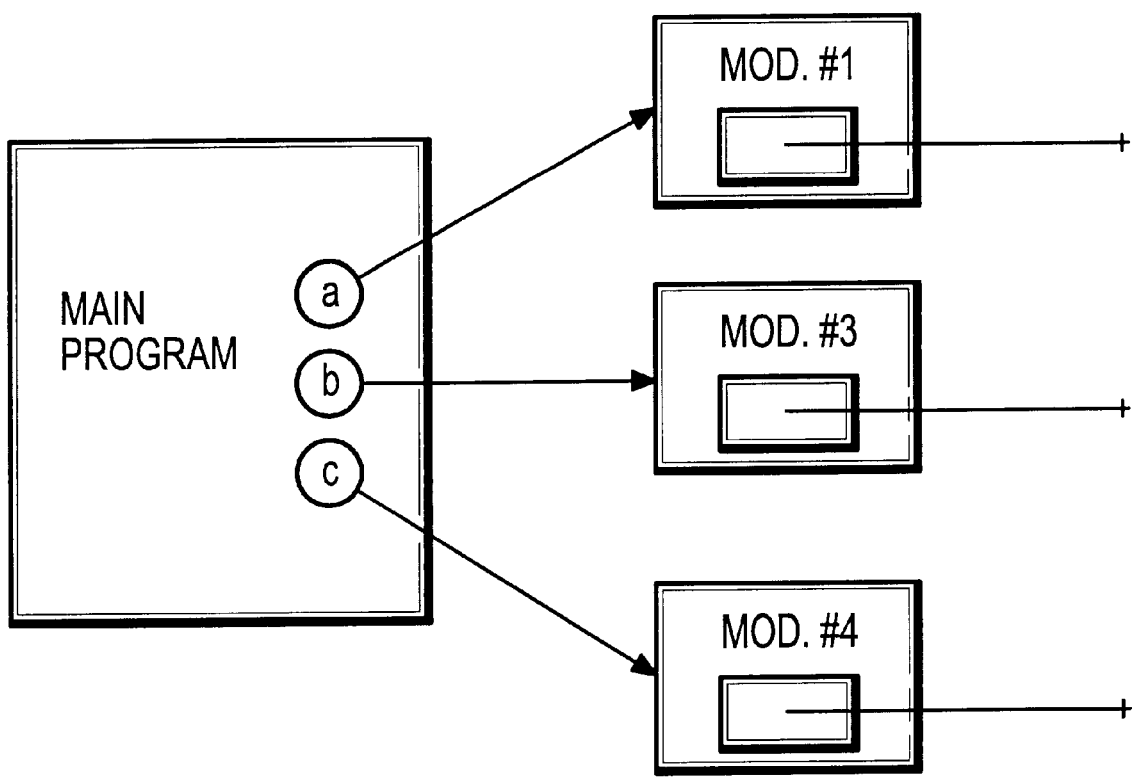

By contrast with the prior art illustration of FIG. 11a, FIG. 11b demonstrates how the process of this invention reduces the size of the executable file, by detecting virtual functions that cannot be called from the application and eliminating their containing modules from the output of the link operation. Using the sample declarations listed above, the links are broken in FIG. 11b because the linker is able to detect that no calls to any g( ) functions occur in the program.

There are essentially three ways to call a virtual function. First, a virtual function may be called through a VFT because of a call like

| | |
|---|---|
| aptr->f( ); | where "aptr" is a pointer to a class object |
| aref.f( ); | and "aref" is a reference to a class object |
| f( ); | occurring inside a member function of a class; this is equivalent to "this->f( );". |

Second, a virtual function may be called directly, bypassing the VFT mechanism entirely. This can happen if the actual class of an object can be determined at compile time, or the user may explicitly indicate which function to call, for example:

aptr->A::f( );

Third, a virtual function may be called through a pointer to a member. This type of pointer is specific to C++ generated by an expression of the form A::f. If the function is virtual, the pointer-to-member contains information about how to find its slot in the VFT. The creation of one of these pointers can therefore be treated similarly to calls through a VFT.

To determine the potentially callable functions called through a VFT or a pointer, the declared type of the pointer or reference is defined as the "Apparent Class" and the function that would be called if there were no virtual functions involved is defined as the "Apparent Callee". The "Apparent Callee" is a member of the "Apparent Class", or of one of its base classes. The Apparent Callee must be well-defined if the call is legal.

Potentially callable virtual functions are all Introducers of all Apparent Callees in the linked object files and all Overriders of those Introducers. In FIG. 10, the Introducer of f( ) is function A::f( ) and the Overriders are function B_A::f( ) and function C_A::f( ).

The actual determination of which functions are potentially callable, which is the second step of the main process of this invention, is accomplished by a linker. The linker uses control data embedded in the object files as its input. The control data is provided by a C++ compiler, or a sequence or collection of programs which, together, comprise a C++ compiler. The compiler embeds extra control data records in the object files it produces. The present invention consequently involves embedding the control data records in the object modules using the compiler, gathering the information from those control records during the linking process using the linker and then using the information to control specific aspects of the subsequent linking process using the linker concurrently with the step of gathering the information. This requires the compiler and linker to perform some activities in addition to those conventionally performed in the prior art.

Figure 2:
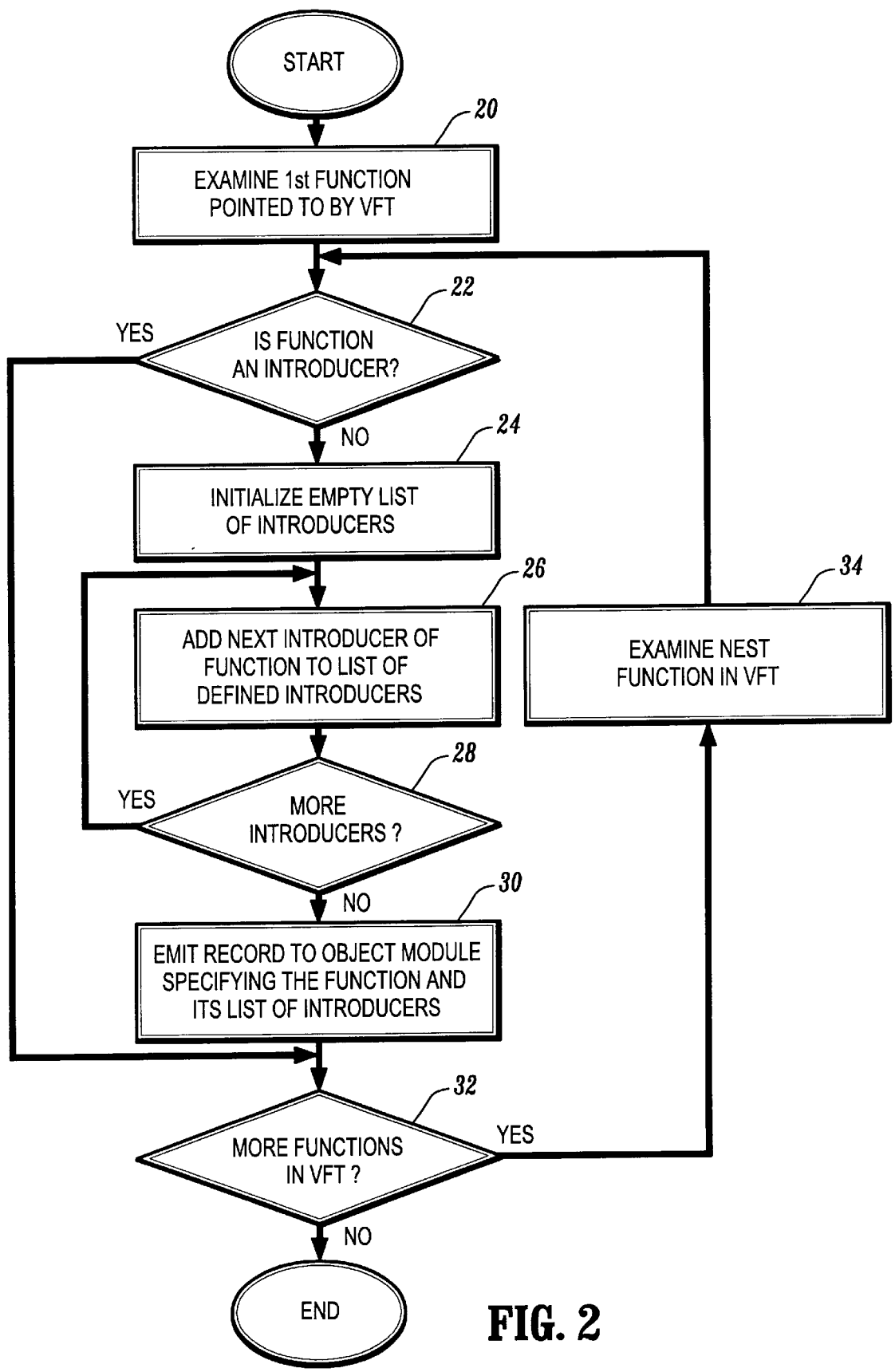
FIG. 2 is a flow diagram of a compiler process for producing a defined introducer record.
Figure 3:
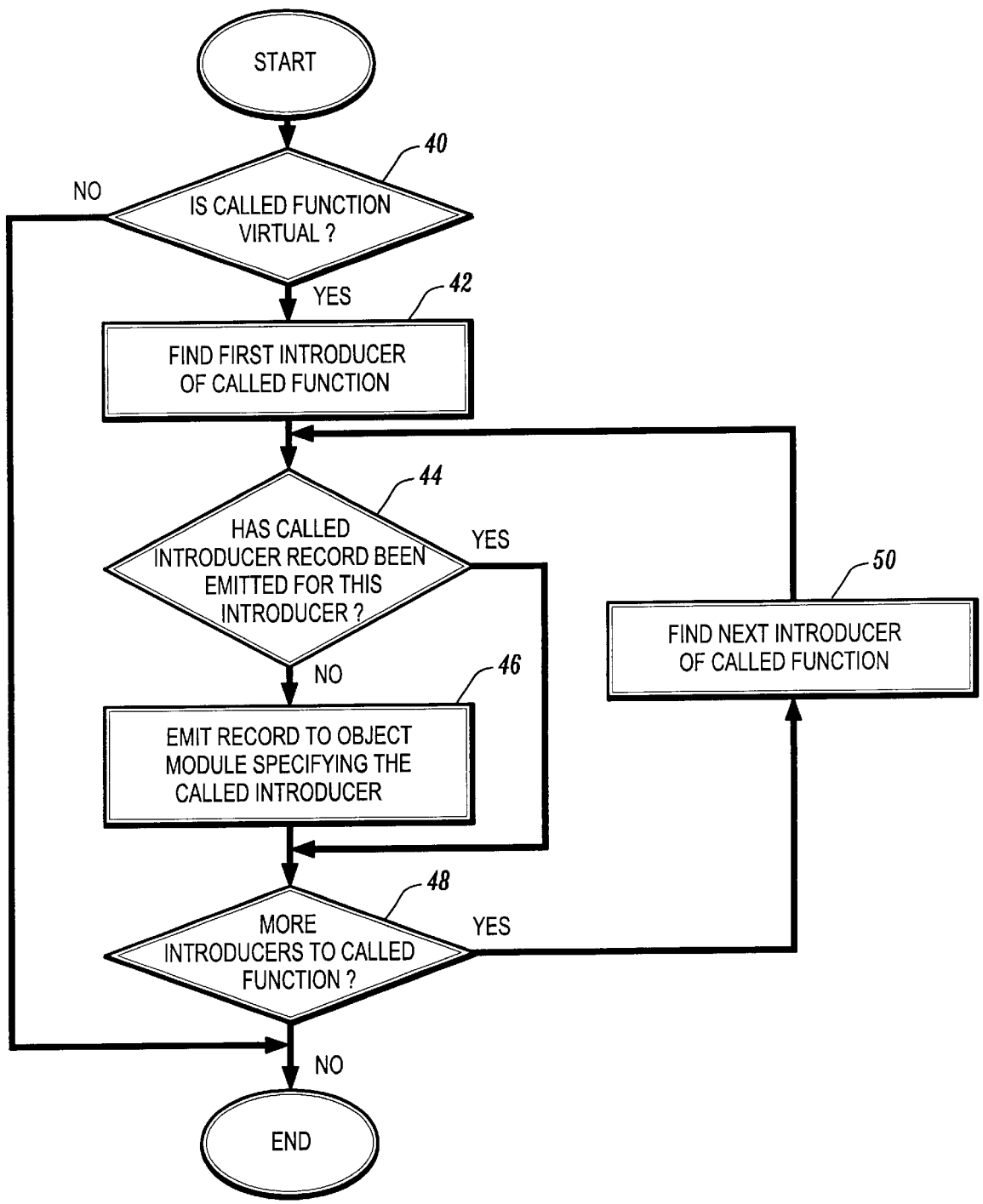
FIG. 3 is a flow diagram of a compiler process for producing a called intruder record.

FIGS. 2 and 3 are diagrams of the additional activities that would be performed by a C++ compiler of conventional design, in order to produce the two principal pieces of extra control data. Of course, the compiler would perform a myriad of other activities when developing a complete object module. Some of these activities would be incidental activities related to the present invention while most would be used in the normal compilation of a C++ program.

A C++ compiler of conventional design will incorporate a symbol table in which the attributes of a function will be stored. The stored attributes will include the "virtual function" attribute which identifies a function as a virtual function. The symbol table also permits navigation through the base classes of a particular class, and thereby enables the identification of a particular virtual function as either an "introducer" or an "overrider". An "overrider" is a virtual function which may be executed at run time as a result of a function call which, in the source code, appears to invoke a similar function previously declared in a related class. The specific rules for when overrides occur are language dependent. A virtual function that does not override another function is an "introducer". Every virtual function, therefore, is either an introducer or an overrider of at least one introducer. As indicated hereinbefore, virtual functions A::f( ) and A::g( ) are introducers whereas functions B_A::f( ), C_A::f( ) and C_A::g( ) are overriders.

Another activity that is performed by any C++ compiler is the creation and definition of virtual function tables. For the purpose of realizing the present invention, this activity is augmented by the additional actions for producing a defined introducer record to be executed when defining a virtual function table illustrated in FIG. 2. The objective of these additional actions is to embed Defined Introducers control data records in the object file produced by the compilation. These control data records will then identify, for each virtual function pointed to by the virtual function table, the introducer or introducers of that function. While the preferred embodiment described and illustrated herein discusses construction of the control data based on the VFT built by the compiler, the control data records can be constructed before construction of the VFT as long as the VFT will be built during this compilation. Similarly, the control data records can be constructed as the VFT is being built, as well as after.

The changes to effect these variations would be obvious to one skilled in the art based on the present disclosure of the invention.

As the contents of the VFT become known during compilation the additional compilation steps shown in FIG. 2 can be performed. As shown in FIG. 2, the compiler examines each function pointed to by the virtual function table to determine whether the function being examined is an "introducer" or an "overrider". The examination can be performed by the compiler reviewing either the VFT itself or the lists from which the compiler built the VFT, according to the preferred embodiment of the invention.

If the function is identified by the compiler as an "overrider", then its "introducers" are those functions declared with the "virtual" keyword in base classes of the current class that have the same name, number and types of parameters as the function being examined and which functions are not themselves "overriders". If the function being examined is itself an "introducer", then it is its own sole "introducer".

While the compiler is defining a virtual function table, it also examines each function pointed to by the virtual function table to determine whether the function is an introducer or an overrider. This is done through the logical process illustrated in FIG. 2. The first function pointed to by the virtual function table is examined (block 20, 22). If it has already been identified as an introducer, the compiler examines the next function pointed to by the virtual function table (block 32, 34). If the function is not identified as an introducer then it must be an overrider and an empty list of introducers for it is initialized (block 24).

The base classes of the class associated with the virtual function table are all navigated to find all the "introducers" of the function currently being examined (block 26). As each "introducer" is found it is added to the list, until there are no more introducers (block 28). When all the "introducers" for the function currently being examined have been identified and listed, a Defined Introducers record identifying the function being examined and each of its listed introducers is emitted to the object module (block 30). This record comprises one of the essential pieces of control data needed to perform the present invention. The location of the control data record in the object module depends on system specific requirements or on the limitations of the linker. For example, a two-pass linker will require the control data record to be in a part of the object module examined during the first pass of the linker operation.

Defined Introducers control data records are necessary to specify the relationship between an "override" and its "introducers" and are, therefore, not produced for functions that are "introducers". If the function is an override and, therefore, not an introducer, then an empty list of "defined introducers" is then initialized or created, as shown in FIG. 2.

It should be noted that, in most circumstances, there will be a single introducer for each override function but, occasionally, the override function may be derived from more that one base class. Because of this possibility, it is necessary to find the introducers in all base classes for each override function.

The process illustrated in FIG. 2 is repeated for each function in the virtual function table so that a record, for each function, specifying the function and its list of introducers is provided to the object module.

A specific implementation for collecting the Defined Introducers control data which is suitable for use in the object module format (OMF) available on the IBM (RTM) OS/2 (RTM) operating system is shown hereinafter. In this implementation, a particular form of the OMF COMENT record is used to collect the Defined Introducers control data, an example of which follows.

$$\begin{array}{cccc} 1 & 1 & 1\text{ or }2 & 1\text{ or }2 \end{array}$$

$$\left[\,\text{'AB'}\,\bigm|\,\text{'06'}\,\bigm|\,\text{Function Index}\,\bigm|\,\text{Introducer Index}\,\right]$$

<repeat>

The designation 'AB' '06' in the header on the record identifies the record as being representative of the Defined Introducers control data.

The Function Index and Introducer Index contain code pointing to a string containing the name of the function being examined by the compiler that the linker will recognize. The compiler selects the Function Index from a collection of name strings which is known as the Method Names collection. This collection is defined by other secondary control data records in the OS/2 operating system. The Introducer Index is also a Method Names collection index. In this case, the Introducer Index is selecting from the collection index the name of a base class method which is an introducer of the function identified by the Function Index.

Other implementations of the present invention could identify the function and introducer by means other than name indices or function names, such as relocatable address or location in compilation database. Other means of identification apparent to those skilled in the art are intended to be covered herein.

FIG. 3 illustrates the additional actions taken by the compiler to implement the invention when it compiles a call to a member function. Specifically, FIG. 3 is at low diagram of a compiler process for producing a called introducer record to be executed when compiling a call to a member function. The purpose of this activity is to embed the Called Introducers control data records in the object file produced by the compilation. These Called Introducer control data records identify, for each virtual function call encountered during compilation, the introducer or introducers of that called virtual function. The Called Introducer control data records may be located in the same or a separate output file from the Defined Introducers control data depending on the number of compilations that have occurred to produce these records.

The activity in FIG. 3 begins with the compiler determining whether the function apparently called is virtual (block 40). This determination is made by inspecting the compiler symbol tables in ways well known in the art. If the function is virtual, the compiler then finds the introducers of the function (block 42). This is possible even though the compiler cannot, in general, determine which function will actually be called at execution time. The compiler then determines whether a called introducer record for each introducer has been emitted to the object module (block 44). If a record has been emitted, the compiler operation is complete. If not, the compiler emits a record specifying the called introducer to the object module (block 46). The process is repeated until all introducers for the called function have been provided to the object module (block 48, 50).

A variation of this design that would be obvious to someone skilled in the art would be to merge the "Called Introducers" records produced by repeated invocations of this activity during a single compile, such that the final object module contains fewer "Called Introducers" records, each of which contains more called introducers.

To implement the invention in an OS/2 operating system, a Called Introducers record of the following format may be used:

$$\begin{array}{cccc} 1 & 1 & 1\text{ or }2 \\ \left[\,\text{'AB'}\,\middle|\,\text{'05'}\,\middle|\,\text{Callee Index}\,\right] \end{array}$$

<repeat>

The Callee Indices are indices into the current object's Method Names collection.

The preceding described Defined Introducers and Called Introducers control records contain the most significant control data embedded in the object module for the purpose of implementing this invention. They are used by the linker to effect the step of identifying potentially callable functions. This information is essential to enable the linker to determine those functions which must be callable by the linked executable file. Other auxiliary control records are used in conjunction with them to define the Method Names collection, and to enable the linker to perform the first step of identifying virtual functions referenced only in VFTs and the third step of nullifying VFT references to functions which are not callable.

Nullification of a reference to a function is meaningful only if that function is represented by an external symbol, and is accomplished by treating the external symbol as though a definition for it were already encountered. The value assumed for this definition will be some conventional null value such as zero, or the address of some location or library entry point that will produce useful diagnostic information if some error allows it to be invoked. Nullified symbols, since they are no longer undefined, will not cause libraries to be searched for their resolution, and will not cause defining library members to be included in the link.

The compiler may embed an auxiliary control record in the object file to specify the conventional value to be used for nullification. A suitable definition for use in the OS/2 OMF object format is:

$$\begin{array}{ccc} 1 & 1 & 1\text{ or }2 \\ \left[\,\text{'AB'}\,\middle|\,\text{'02'}\,\middle|\,\text{EXTDEF Index}\,\right] \end{array}$$

The EXTDEF Index field is the index to the external symbol that should be used as the default resolution for nullified VFT references. In the OS/2 object module format, "EXTDEF Index" is the standard way to refer to an external linker symbol. As a special case, index 0 is valid and causes nullified VFT references to be defaulted to virtual address 0 (i.e. FLAT:0).

The step of identifying functions referenced from VFTs is enabled by the compiler which embeds auxiliary control data in object modules that define VFTs. The control data can directly identify those functions referenced from VFTs, using a notation resembling that employed in the Defined Introducers and Called Introducers records.

A better alternative and one that requires less space in the object module, is to emit control data identifying the VFTs. The linker may then examine the records in the object module that contain the VFT data and that describe its symbolic references, and thereby accumulate a list of functions to which the VFTs refer. The provision of appropriate data and symbolic reference records is already common practice in existing object module formats, and the only required addition is the control record data to identify the VFTs.

On OS/2, all data and code is associated, either explicitly or implicitly, with a "segment" which is a logical collection of storage with common attributes and, often, a name. Therefore, we identify functions referenced in VFTs by creating special segments that contain only VFTs. This ensures that every VFT is associated with a special segment, and indicates to the linker which segments are special in this way.

$$\begin{array}{ccc} 1 & 1 & 1\text{ or }2 \\ \left[\,\text{'AB'}\,\middle|\,\text{'01'}\,\middle|\,\text{Segment Index}\,\right] \end{array}$$

<repeat>

The segment indices identify segments that contain virtual function tables. The use of indices to identify segments is existing practice in the OS/2 object module format.

Other auxiliary control data records are embedded as required in the object module in order to define tables or collections of strings, symbols, or other data used by the principal embedded control data records. Such use of tables and collections is well understood by those skilled in this art. These tables and collections serve to reduce the size of the object module relative to a more straightforward implementation where the symbols or strings are contained directly in the principal control data records. In the OS/2 implementation, the Method Names collection is indexed by numeric fields in the Defined Introducers and Called Introducers records, and two auxiliary control data records are used to define this collection. One record contains names as strings of characters, while the other record refers to an external symbol whose name is already present in the object module and should be included in the table.

The first record is of the following format:

$$\begin{array}{cccc} 1 & 1 & 1 & <\text{variable}> \\ \left[\,\text{'AB'}\,\middle|\,\text{'03'}\,\middle|\,\text{name length}\,\middle|\,\text{name string}\,\right] \end{array}$$

<-------- repeat -------->

The other record is of the following format:

$$\begin{array}{ccc} 1 & 1 & 1\text{ or }2 \\ \left[\,\text{'AB'}\,\middle|\,\text{'04'}\,\middle|\,\text{EXTDEF Index}\,\right] \end{array}$$

<repeat>

These records add names into the Method Names collection, such that a Method Names collection index appearing in Defined Introducer or Called Introducer records, having the value one, selects the first name added by the first such record, the value two selects the second, and so on.

The previously described control data records are embedded by the compiler in the object modules, following the activities illustrated in the FIGS. 2 and 3. This provides sufficient information to the linker to enable it to perform the third step of the invention of eliminating or omitting uncallable virtual functions from the output of the link step. The linker activities which realize this step will now be explained.

The task of excluding uncallable virtual functions is achieved by the linker, pre-linker, or similar utility using the aggregated control data to exclude from the application program those virtual functions which, although referenced by virtual function tables that will appear in the application program, will never be invoked during any execution of the application, as determined from the aggregated control data.

The task of identifying those virtual functions which are referenced only from VFTs can be enabled by explicitly embedding control records which identify those functions, as previously noted. However, some object module formats make it possible to assemble a list of functions they refer to by inspecting the VFTs themselves and their symbolic references, also as previously noted.

One obstacle to this improvement is that the VFTs may or may not be external symbols, that is, the names of the VFTs may or may not be visible outside the object module. Therefore, VFTs cannot be recognized by giving them specific names because, if they are not external symbols, their names may not be stored in the object module. In the implementation herein described, this problem is solved by placing all VFTs in special segments and embedding a previously described control record which identifies the special segments to the linker. We can then inspect all C++ objects, looking for data records for the VFT segments. Each time we find one, we must then inspect the linker records that immediately follow it. These immediately following records describe the external references that the linker should patch up in its preceding record. These are the virtual function references which must be accumulated. Internal references, that is, references to virtual functions defined in the same object, will probably be missed this way because, although a linker record will exist for them, the record will not refer to an external symbol. However, it is always safe to accumulate fewer functions in this task than the full set of them.

In addition to inspecting linker records for data records for VFT segments, it is also necessary to scan the linker records for other data and code records. Any virtual functions that are referenced by code, or by a non-VFT data record, must be removed from the accumulated list. The final list must contain only virtual functions whose references are all from VFT segments.

FIGS. 4 through 8 illustrate activities that the linker performs to implement its part of the present invention. The embodiment of the invention assumed in these figures is, therefore, an embodiment involving cooperation between the compiler performing the activities of FIGS. 2 and 3, and the linker performing the activities of FIGS. 4 through 8.

FIGS. 4–8 describe activities performed by a linker of conventional two pass design, and constitute a modification of its behaviour such that it will collect the extra control data contained in the "Defined Introducers" and "Called Introducers" records embedded in the object modules supplied as input from the compiler to the linking activity and control data records contained in object modules contained in libraries or similar archives accessed by the linker. The linker will also collect auxiliary embedded control data which enables it to determine which virtual functions are referenced only from VFTs. The linker will then use the collected control data to exclude, from the executable program, C++ virtual functions which the linker can now determine will never be invoked.

Figure 4:
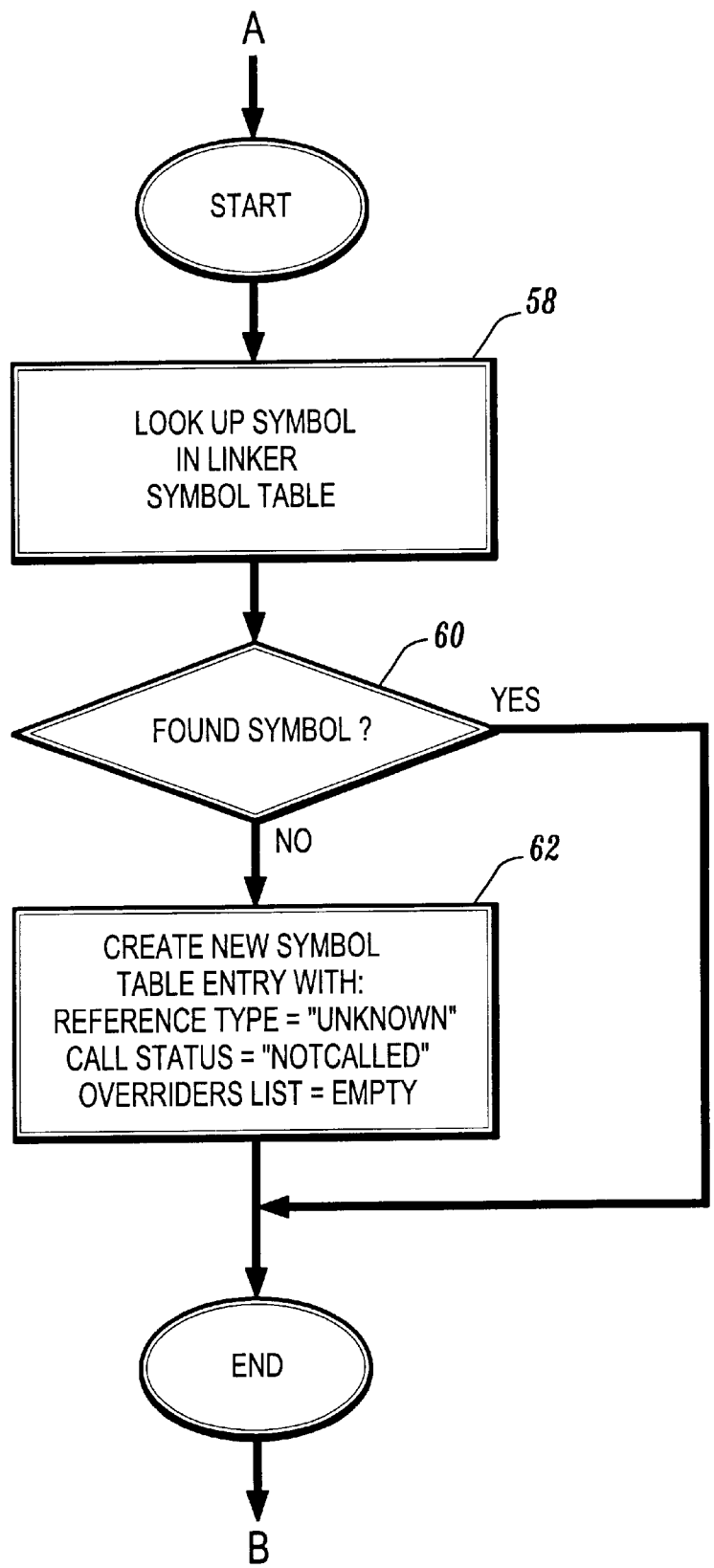
FIG. 4 is a flow diagram of a linker process for finding or entering a symbol into a symbol table.

FIG. 4 describes a modification to the conventional linker activity of "finding or entering" a symbol in the linker's symbol table. It is expected that a conventional two pass linker will perform this activity during the first pass when it encounters a symbol definition or reference in an object module that is included in the link. The object module is either explicitly named as an input to the link operation, or is extracted from a library or similar archive of object modules. A "symbol" is an element of a large set of comparable data items, generally talking the form of a string of printable characters, to which are attached attributes including, but not limited to, a type, a value, and a scope of visibility. Symbols are defined within object modules and, if they have an external scope of visibility, their values may be referred to by other object modules. The matching up, or "linking", of symbol definitions with references is a principal activity of a linker or of a linking loader.

The "symbol table" is a searchable table maintained by the linker, and contains entries for symbols defined and/or referenced in object modules included in the link. Each entry contains the symbol itself plus associated information about the symbol that the linker requires in order to perform its function. Typically, this will include the type, value, and scope of visibility attributes of the symbol, but may also include other information.

When a linker encounters a symbol in an object module during the first pass, the linker will typically perform the action of "finding or entering the symbol in the symbol table" (block 58, 60). This consists of locating the symbol's entry if it is already in the symbol table or creating a new entry if it is not already in the table.

The modification to the "find or enter" action normally performed by the linker is shown in FIG. 4. The linker, during the first pass, now establishes the initial values of three new pieces of associated information for newly created symbol table entries (block 62). The first piece of associated information is a "reference type". The "reference type" may have one of the three values "UNKNOWN", "NONVFT", or "VFT". A second piece of information is a "call status", which takes on one of the values "CALLED" or "NOT-CALLED". The third piece of associated information is an "OVERRIDERS" list. This is a list of symbols and may, at any time, contain 0 or more symbols.

Figure 5:
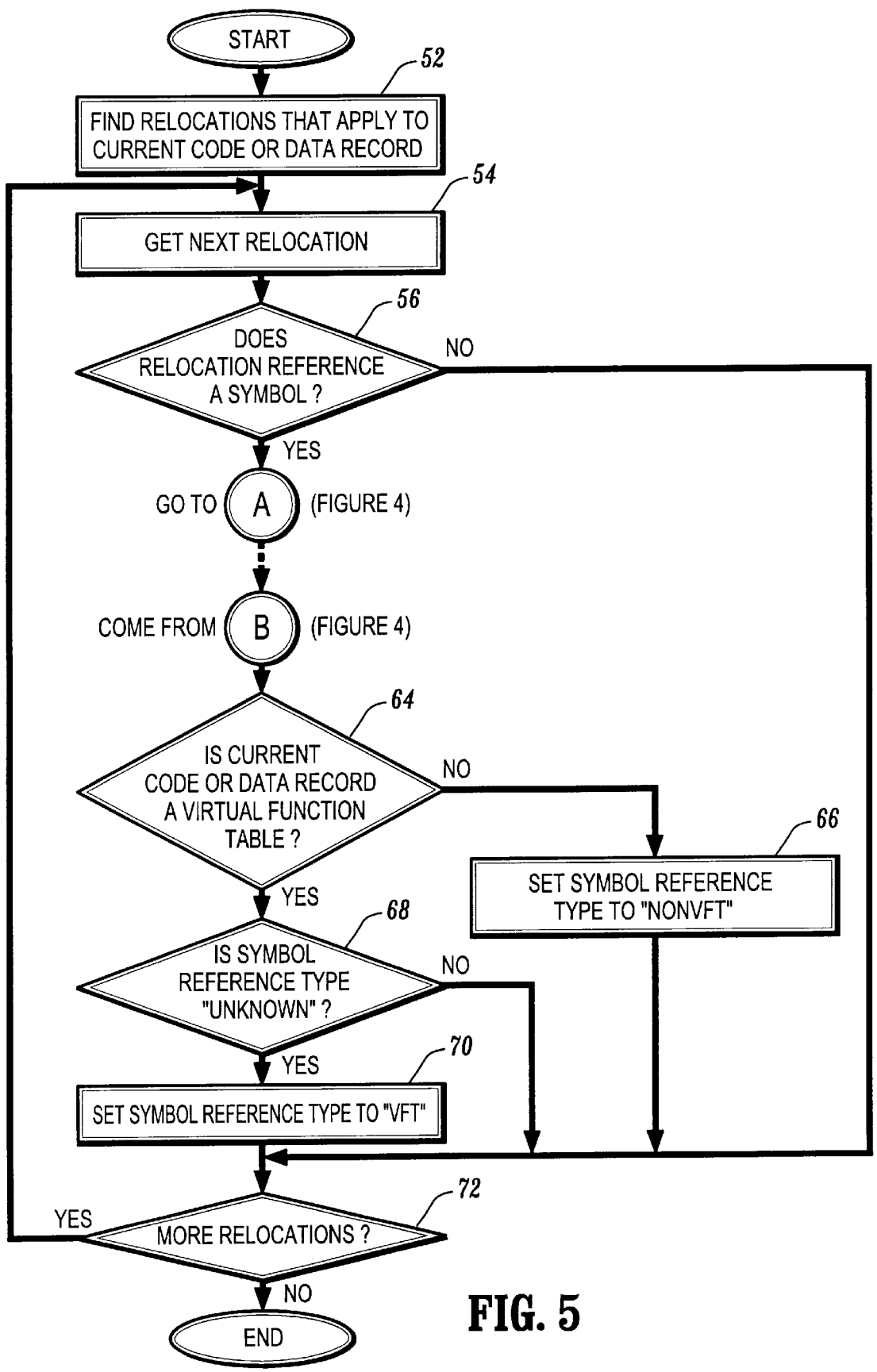
FIG. 5 is a flow diagram of a linker process performed on a code or data record.

A refinement of this design that would be obvious to someone skilled in the art is to provide these three extra pieces of associated information only for symbol table entries that correspond to symbols representing virtual functions. FIG. 5 shows the extra activities required to determine which virtual functions are referenced only from VFTs. A VFT is a data structure that contains the addresses of virtual functions, and this containment is reflected in the existence of relocations applying to the data record containing the virtual function table. A "relocation" is an item of control information in an object module that describes how a machine code or data item should be modified by the linker or loader. Such modification depends on the ultimate location of that item or some other code or data item, or on the value of some symbol. Relocations applying to a VFT direct the linker or loader to store the addresses of external virtual functions in the virtual function table. The relocations will necessarily reference symbols representing the virtual functions, if those virtual functions are in other object modules.

Similarly, other code or data records that do not contain VFTs may also refer to virtual functions. If they do, this will be discernible by inspecting the relocations applying to those other code or data records.

As shown in FIG. 5, when the linker encounters a code or data record, it locates the relocations that apply to that record (block 52). The relocations are then accessed in sequence and each is examined to determine whether it references a symbol (block 54, 56). If it does reference a symbol, the linker symbol table is examined to determine whether the symbol is already in the table. If the symbol is already in the linker symbol table the linker moves on to the next step. If the symbol is not in the table, the linker adds the symbol to the table, as previously shown in FIG. 4, and proceeds to the next step. At this next step, the linker determines whether the part of the current code or data record affected by the relocation comprises a VFT (block 64, FIG. 5). If the code or data record is not a VFT, the symbol reference type is set to "NONVFT" (block 66). If the code or data record is a VFT, the linker first checks whether the present value of the symbol table entry's "reference type" field has the value "UNKNOWN". If the reference type is "UNKNOWN", the symbol reference type is set to "VFT" (block 68, 70). The linker repeats the cycle until there are no more relocations at which point this additional linker activity is terminated (block 72). As a result of this activity, the symbol table entries for virtual functions will have a "reference type" field value of "UNKNOWN" if they are never referenced, "NON-VFT" if they are referenced at least once by code or data that is not a VFT, and "VFT" if they are referenced at least once and all references are from VFTs.

For the activity described in FIG. 5, the linker must be able to distinguish whether an encountered code or data record is a virtual function table. In the OS/2 implementation, this is accomplished by affiliating virtual function tables with a distinctive memory "segment" which is identified by a previously described auxiliary control data record. The segment affiliation of a code or data record is already available in the OS/2 object module format. Other systems may distinguish virtual function tables in other ways, including, but not limited to, defining recognizable symbols whose values are the addresses of the code or data in the code or data record. Some C++ implementations don't store virtual function addresses in the virtual function table, instead they store the addresses of "thunks". "Thunks" are small sequences of machine code which call the actual virtual functions. It is an obvious variation of the described technique to modify the activity in FIG. 5 so that, instead of working with symbols referenced from virtual function tables, it deals with symbols referenced from these virtual function "thunks". Specifically, the test "Is current code or data record a virtual function table?" would be modified to "Is current code or data record a virtual function thunk?"

Figure 6:
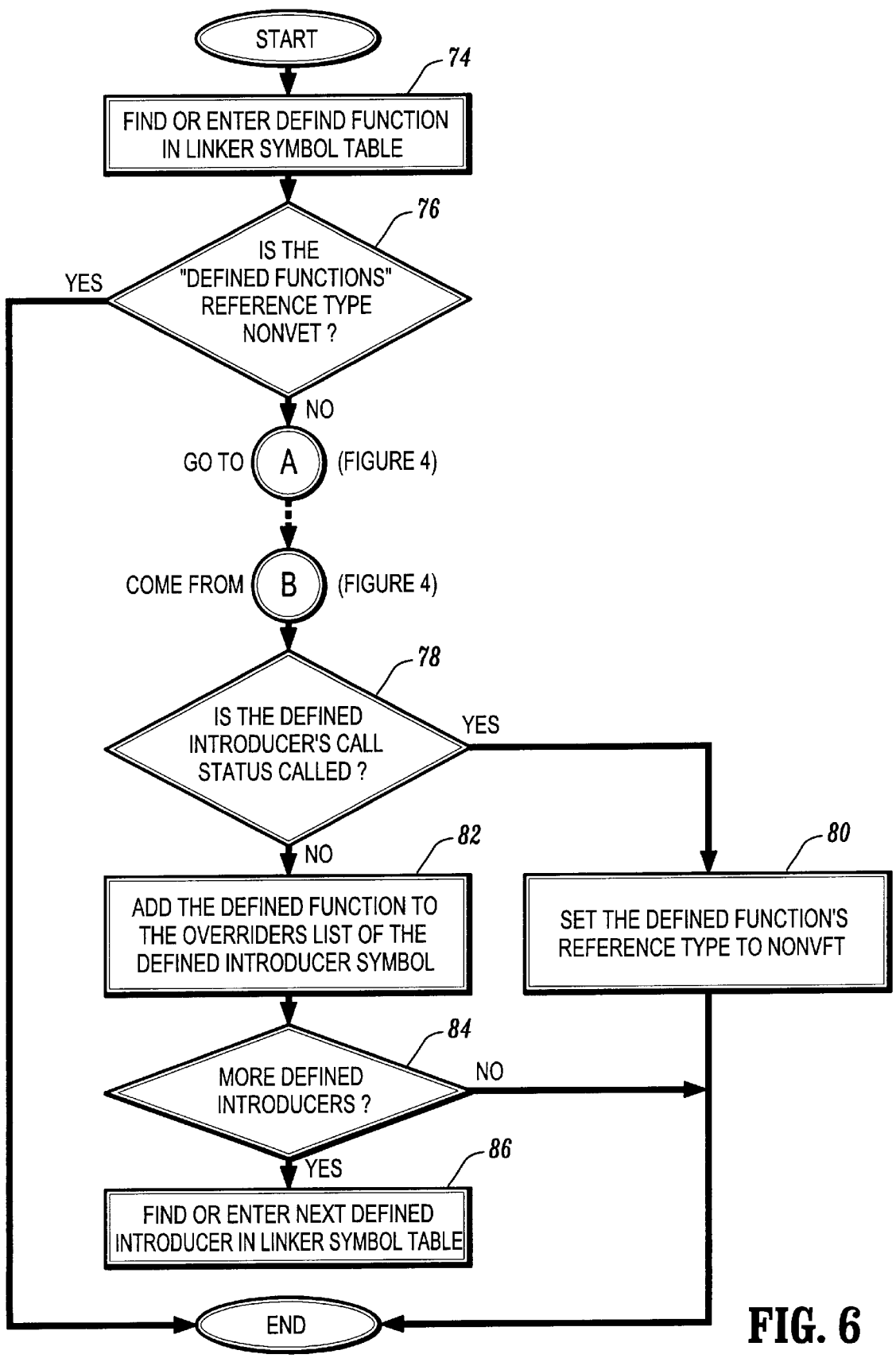
FIG. 6 is a flow diagram of a linker process performed on a defined introducer's record.

FIG. 6 indicates additional activities performed by a linker to aggregate information contained in the embedded Defined Introducers control data records. The compiler produced the Defined Introducers control data records by the process described in FIG. 2. As discussed previously, these control records identify a Function and one or more of its Introducers. As shown in FIG. 6, the linker looks up the Function in the linker symbol table or, if it is not there, adds the Function to the table (block 74). Then, the linker examines the reference type of the symbol table entry just found or entered, to determine whether the Function has yet been found to have "NONVFT" references (block 76). If the Function has a "NONVFT" reference type, then it is referenced from other than a VFT and cannot be omitted from the link, so no further additional activity with respect to that function occurs. If the Function has a "VFT" reference type, the linker finds or enters the first Defined Introducer listed in the Defined Introducers control data record in the linker symbol table in the manner described in relation to FIG. 4. The linker then inspects the "call status" information associated with the Defined Introducer's symbol table entry (block 78). If the status is "CALLED", the reference type of the Function is set to "NONVFT" to indicate that the Function may not be omitted from the link, and the linker activity is complete (block 80).

If, instead, the call status of the Defined Introducer is "NOTCALLED", the linker adds the defined function to the OVERRIDERs list of the defined introducer symbol (block 82). The linker then continues to process any other Defined Introducers listed in the embedded Defined Introducers control data record (block 84). If none are present, the linker pass is complete. If more defined introducers are found they are found or entered in the linker symbol table (block 86) and the call status determined and defined functions added to the OVERRIDERs list until no further defined introducers are encountered. At this point this linker pass is complete.

The effect of the combined actions shown in FIG. 6 and FIG. 2 is that, for every virtual function that has a VFT or UNKNOWN reference type, the linker will inspect all defined introducers of that function to determine if any of them are marked as CALLED. Those that are marked as CALLED are potentially callable and, therefore, the present function, which is an override of that introducer, is also callable, and its reference type is changed to NONVFT to reflect this. If none of the function's defined introducers are marked as CALLED, then the function is added to the OVERRIDERS list of each defined introducer, in anticipation of the activity described hereinafter and shown in FIG. 7.

Figure 7:
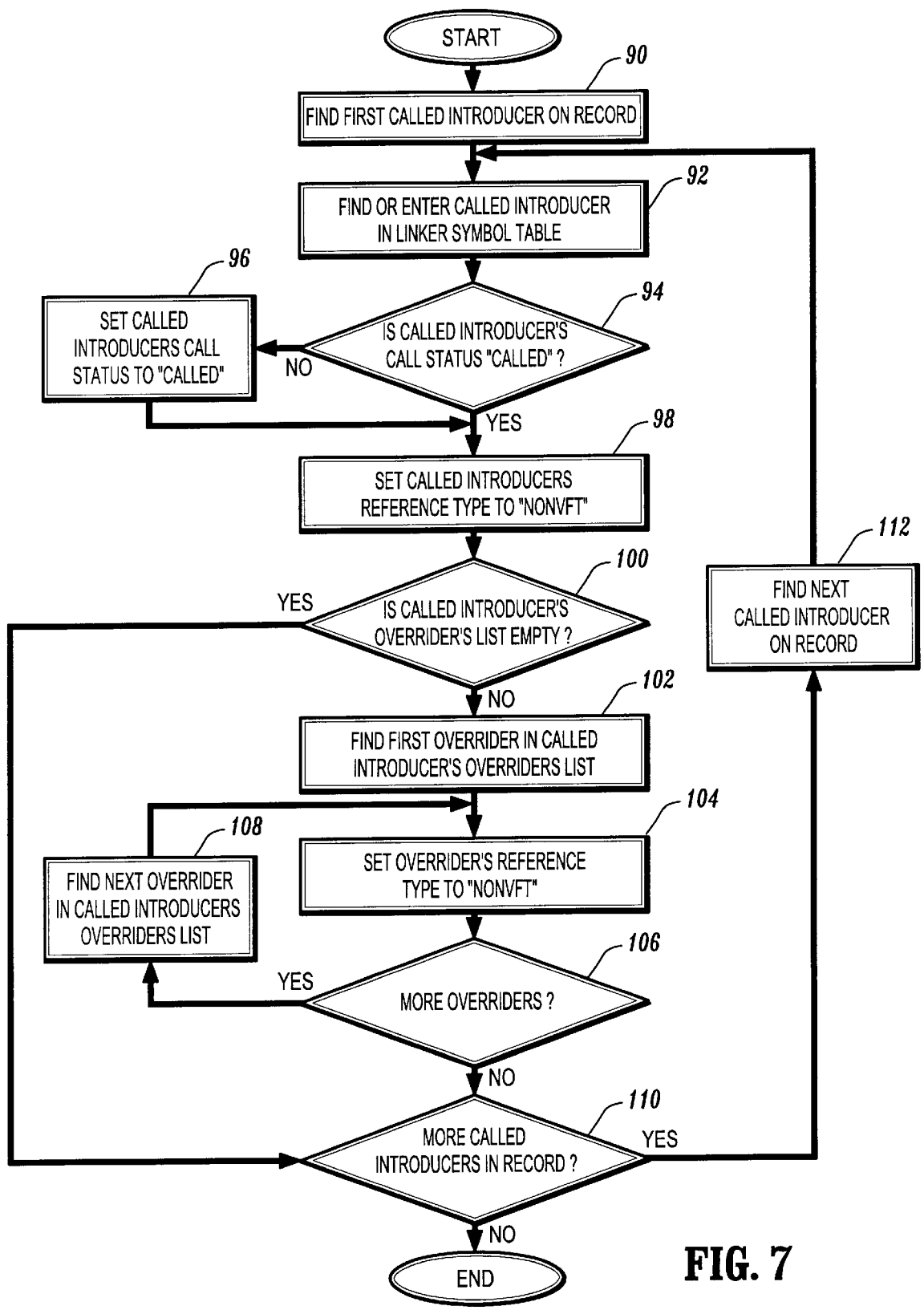
FIG. 7 is a flow diagram of a linker process performed on a called introducer record.

FIG. 7 illustrates a new action to be performed by the linker during the first pass when it encounters a "Called Introducers" record. The linker first finds and enters each "called introducer" into the linker symbol table (block 90, 92). The status of each "called introducer" is determined and, if not already "CALLED" (block 94, 96), is set to "CALLED". The reference type for each "called introducer" is also set to "NONVFT" (block 98) to indicate that it may not be omitted from the link. Then each of the symbols in each of the Called Introducer's "OVERRIDERS" list is found and the reference type for each of these found symbols is also set to "NONVFT" (block 100 to 108). This is repeated with all Called Introducers in the record (block 110, 112).

For each Called Introducer, the activity of FIG. 7 will ensure that the Called Introducer's call status is CALLED, therefore, if the same symbol is found to be a Defined Introducer in a subsequent execution of FIG. 6, then the virtual function for which it is an introducer will be recognized as being potentially callable. Also, the reference types of the Called Introducer and of all Overriders of the Called Introducer accumulated in the OVERRIDERS list of its symbol table entry, by preceding invocations of the activity of FIG. 6, are also given a reference type of NONVFT, indicating that they are also potentially callable and may not be omitted from the link.

Figure 8:
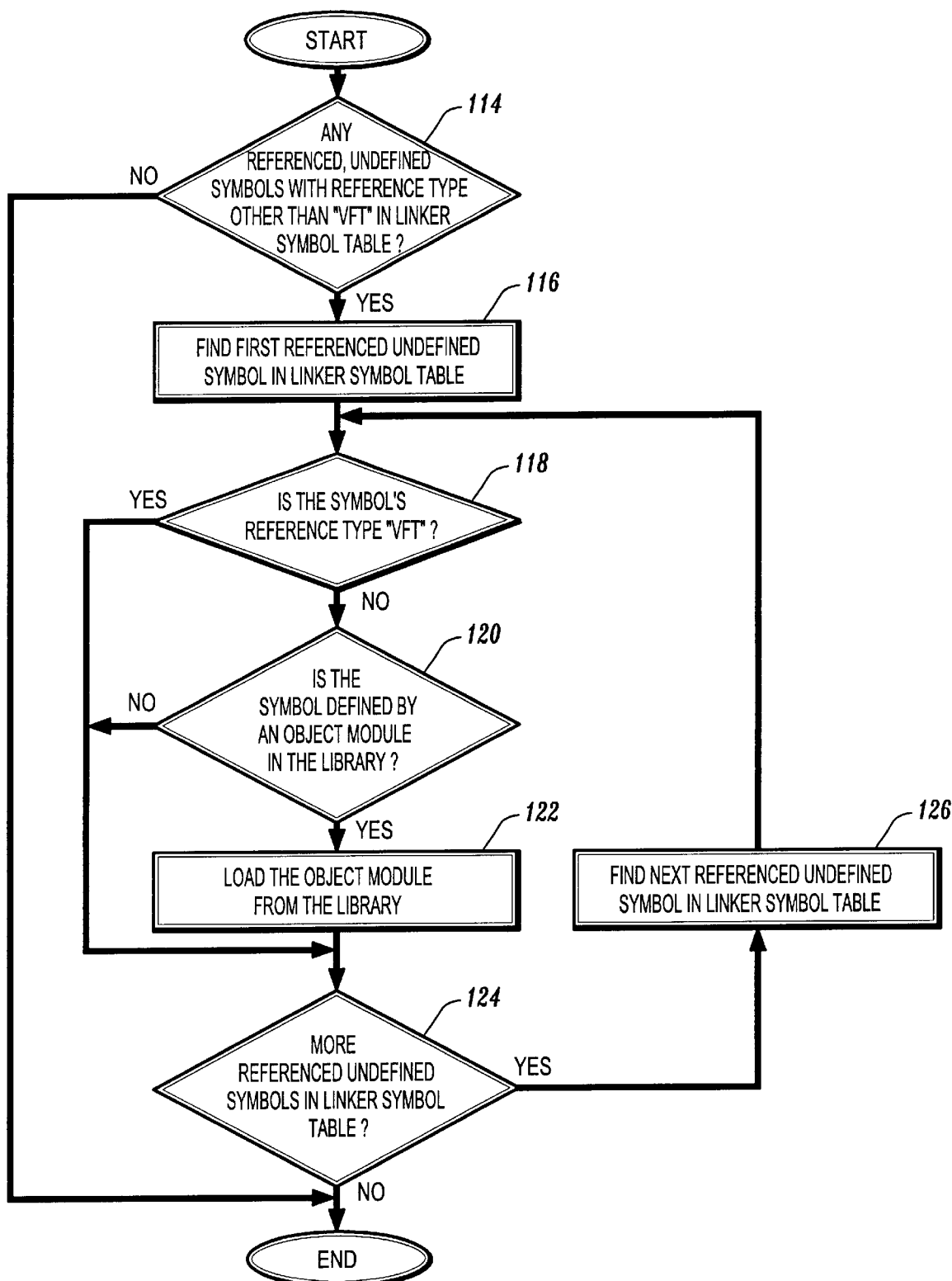
FIG. 8 is a flow diagram of a linker process performed when reading a static library.

FIG. 8 illustrates a modification to the activity performed by a two pass linker of conventional design when examining a static library or similar archive of object modules during the first pass. The purpose of the activity is to decide which object modules to load from the archive, and to base this determination on the callability information accumulated by the execution of FIGS. 4 through 7.

A linker of conventional design will make this decision based on the following criterion: an object module is loaded from the archive if it defines any symbols of external scope visibility, which are currently found in the linker's symbol table, and are marked as referenced but not yet defined.

The modification embodied in FIG. 8 is that the criterion is changed as follows: an object module is loaded from the archive if it defines any symbols of external scope visibility, which are currently found in the linker's symbol table, and are marked as referenced but not yet defined, and whose reference type is not VFT (block 114 to 126).

This modification excludes those symbols which represent virtual functions and which have explicit relocations in some object module that refer to them and that are associated with a virtual function table (these are the conditions for changing a reference type from UNKNOWN to VFT in FIG. 4), and do not have relocations that are associated with a code or data record that is not a virtual function table (otherwise the reference type would be changed to NON-VFT in FIG. 4), and which are not called introducers (otherwise the reference type would be changed to NON-VFT in FIG. 7) and are also not overriders of called introducers (otherwise the reference type would be changed to NONVFT in FIG. 6 or in FIG. 7, depending on the relative order in which defined introducer and called introducer records were encountered).

One more step not illustrated occurs at the end of linker pass 1. Pass 1 ends when the symbol table contains no referenced undefined symbols whose reference type is not "VFT", or when all available libraries have been searched without resolving any referenced undefined symbols. At this time, the remaining referenced undefined symbols with reference type "VFT" should be given default definitions; the value to supply as a definition is supplied in the herein described OS/2 implementation by an auxiliary control data record.

The embodiments of the invention in which an exclusive property or privilege is claimed are defined as follows:

1. In a computing environment having a compiler means for compiling an object oriented source program into object modules and linker means for linking the object modules into an executable file, said linker means including means for initializing virtual function tables for invoking virtual functions at runtime, a method for generating the executable file comprising the steps of:
    generating control data that identifies a virtual function as a member of a distinct set, and that identifies sets of virtual functions that are potentially invocable at runtime;
    combining the generated control data to derive a final set of virtual functions that are potentially invocable at runtime; and
    linking only virtual functions in the final set, and nullifying references to virtual functions not in the final set.

2. A method according to claim 1 wherein the step of generating control data comprises:
    compiling a list of defined introducers for each virtual function encountered during compilation of said source program;
    compiling a list of called introducers, each called introducer identifying a group of virtual functions which includes a virtual function that is apparently called; and
    embedding said lists as the control data records in object modules,
    and wherein said step of combining the control data to derive the final set of virtual functions that are potentially invocable comprises the steps of:
        accumulating a set of virtual functions referenced only through a virtual function table; and
        removing from the accumulating set all virtual functions that are members of sets containing a called introducer.

3. The method according to claim 2, wherein said step of linking only virtual functions in the derived set comprises the step of linking pointers to virtual functions potentially used as determined from said lists of defined introducers and said list of called introducers embedded as the control data records, and said list of virtual functions.

4. A method, according to claim 1, wherein the step of generating control data includes embedding control data for each virtual function table in one of said object modules.

5. A method, according to claim 4, wherein the step of generating control data comprises:
    compiling a list of defined introducers for each virtual function encountered during compilation of said source program; and
    compiling a list of called introducers for each object module,
    and wherein the step of linking only virtual functions identified as potentially invokable at runtime comprises:
        accumulating a list of virtual functions which can only be called through a virtual function table; and
        linking pointers to virtual functions actually used as determined from said lists of defined introducers and said list of called introducers, and said list of virtual functions.

6. A method according to claim 1 wherein the step of linking only virtual functions identified as potentially invokable at runtime comprises nullifying references to virtual functions that are not potentially invokable at runtime prior to initializing the virtual function tables during linking.

7. An improved system for converting source code written in an object oriented language into an executable file, said improvement comprising:
    means for identifying virtual functions as one of potentially invocable at runtime and not potentially invocable at runtime, wherein said identifying means comprises:
        means for identifying each virtual function defined by a virtual function table as one of an introducer or an overrider, each overrider overriding at least one introducer;
        means for identifying a set DI of introducers for each of the overriders;
        means for identifying a set VFT of virtual functions that are only referenced in virtual function tables;
        means for identifying a set CI of introducers for each potential call to a virtual function
        means for identifying a set DI of introducers for each of the overriders; and
        means for identifying a set NPI of virtual functions not potentially invocable at runtime, the set NPI comprising the virtual functions remaining in the set VFT upon removing all introducers in the set DI for which there exists an introducer in the set CI; and
    means for generating said executable file to exclude those virtual functions that are in the set NPI of virtual functions.

8. A program storage device, tangibly embodying a program of instructions executable by a machine in a computing environment for performing method steps for generating an executable file from object modules, the method comprising the steps of:
    generating control data identifying each virtual function table, said control data identifying virtual functions as one of potentially invocable at runtime and not potentially invocable at runtime; and
    linking only virtual functions identified by said control data as potentially invocable at runtime and nullifying references to virtual functions identified by said control data as not potentially invocable at runtime,
    wherein said generating step comprises the step of identifying virtual functions as one of potentially invocable at runtime and not potentially invocable at runtime, said identifying step comprising the steps of:

identifying each virtual function defined by a virtual function table as one of an introducer or an overrider, each overrider overriding at least one introducer;

identifying a set DI of introducers for each of the overriders;

identifying a set VFT of virtual functions that are only referenced in virtual function tables;

identifying a set CI of introducers for each potential call to a virtual function;

identifying a set DI of introducers for each of the overriders; and identifying a set NPI of virtual functions not potentially invocable at runtime, the set NPI comprising the virtual functions remaining in the set VFT upon removing all introducers in the set DI for which there exists an introducer in the set CI.

9. A method for generating a run-time representation of an object oriented source program that defines and calls virtual functions, the method comprising the steps of:

generating control data that identifies a virtual function as a member of a distinct set, and that identifies sets of virtual functions that are potentially invocable at runtime;

combining the generated control data to derive a final set of virtual functions that are potentially invocable at runtime; and generating virtual function tables for invoking virtual functions at runtime based upon said control data, wherein said virtual tables include pointers only to virtual functions in the final set, and nullifying references to virtual functions not in the final set.

10. The method of claim 9, wherein the step of generating control data comprises the steps of:

compiling a list of defined introducers for each virtual function encountered during compilation of said source program;

compiling a list of called introducers, each called introducer identifying a group of virtual functions which includes a virtual function that is apparently called; and embedding said lists of defined introducers and said list of called introducers as control data records in the object modules and wherein said step of combining the control data to derive the set of virtual functions that are potentially invocable comprises the steps of:

accumulating a set of virtual functions referenced only through a virtual function table; and removing from the accumulating set all virtual functions that are members of sets containing a called introducer.

11. The method according to claim 10, wherein said step of generating virtual function tables comprises the step of adding virtual function pointers to said virtual function tables, wherein each virtual function pointer identifies a virtual function that is potentially invocable at runtime as determined by said control data records and said list of virtual functions.

12. The method of claim 9, wherein said control data associated with each virtual function is embedded in one of a plurality of object modules compiled from said source program.

13. The method of claim 9, wherein the step of generating virtual function tables includes the step of:

prior to initializing said virtual function tables, nullifying references to virtual functions whose associated control data identifies said virtual functions as not potentially invokable at runtime.

14. A program storage device readable by a machine, tangibly embodying a program of instructions executable by the machine for performing method steps for generating a run-time representation of an object oriented source program that defines and calls virtual functions, the method comprising:

generating control data that identifies a virtual function as a member of a distinct set, and that identifies sets of virtual functions that are potentially invocable at runtime;

combining the generated control data to derive a final set of virtual functions that are potentially invocable at runtime; and generating virtual function tables for invoking virtual functions at runtime based upon said control data, wherein said virtual tables include pointers only to virtual functions in the final set, and nullifying references to virtual functions not in the final set.

15. The program storage device of claim 14, wherein the step of generating control data comprises the steps of:

compiling a list of defined introducers for each virtual function encountered during compilation of said source program;

compiling a list of called introducers, each called introducer identifying a group of virtual functions which includes a virtual function that is actually called; and embedding said lists of defined introducers and said list of called introducers as control data records in object modules; and wherein the step of generating virtual function tables comprises the steps of:

accumulating a list of virtual functions that are only referenced through a virtual function table; and adding virtual function pointers to said virtual function tables, wherein each virtual function pointer identifies a virtual function that is potentially invokable at runtime as determined by said control data records and said list of virtual functions.

16. The program storage device of claim 14, wherein said control data associated with each virtual function is embedded in one of a plurality of object modules compiled from said source program.

17. The program storage device of claim 14, wherein the step of generating virtual function tables includes the step of:

prior to initializing said virtual function tables, nullifying references to virtual functions whose associated control data identifies said virtual functions as not potentially invokable at runtime.

* * * * *